United States Patent [19]
Urbutis et al.

[11] 3,766,603
[45] Oct. 23, 1973

[54] SHIRRED TUBING, METHOD AND APPARATUS FOR MAKING SAME

[75] Inventors: Algimantas P. Urbutis, Chicago; Bernard H. Schenk, Hinsdale; Joseph J. Risany, La Grange Park; Walter V. Marbach, Palos Heights, all of Ill.

[73] Assignee: Union Carbide Corporation, New York, N.Y.

[22] Filed: Mar. 5, 1970

[21] Appl. No.: 16,825

Related U.S. Application Data

[60] Continuation-in-part of Ser. No. 765,711, May 31, 1968, which is a division of Ser. No. 418,506, Dec. 15, 1964, Pat. No. 3,397,069.

[52] U.S. Cl. ................................................ 17/42
[51] Int. Cl. .......................................... A22c 13/00

[58] Field of Search ........................... 17/42, 45, 49

[56] References Cited
UNITED STATES PATENTS
3,112,517   12/1963   Ives .......................................... 17/2
3,315,300    4/1967   Ziolko ...................................... 17/42

Primary Examiner—Lucie H. Laudenslager
Attorney—Paul A. Rose, John F. Hohmann and Franklyn Schoenberg

[57] ABSTRACT

A method and apparatus are provided for uniformly compressing and compacting a length of flexible, tubular sausage casing into a coherent, shirred casing stick which, from end to end, exhibits circumferential uniformity, is substantially straight and has an uninterrupted, uniform bore.

13 Claims, 11 Drawing Figures

INVENTORS
Algimantas P. Urbutis
Bernard H. Schenk
Joseph J. Risany
Walter V. Marbach
By John F. Hohmann
ATTORNEY INVENTORS.
Algimantas P. Urbutis
Bernard H. Schenk
Joseph J. Risany
Walter V. Marbach

ATTORNEY

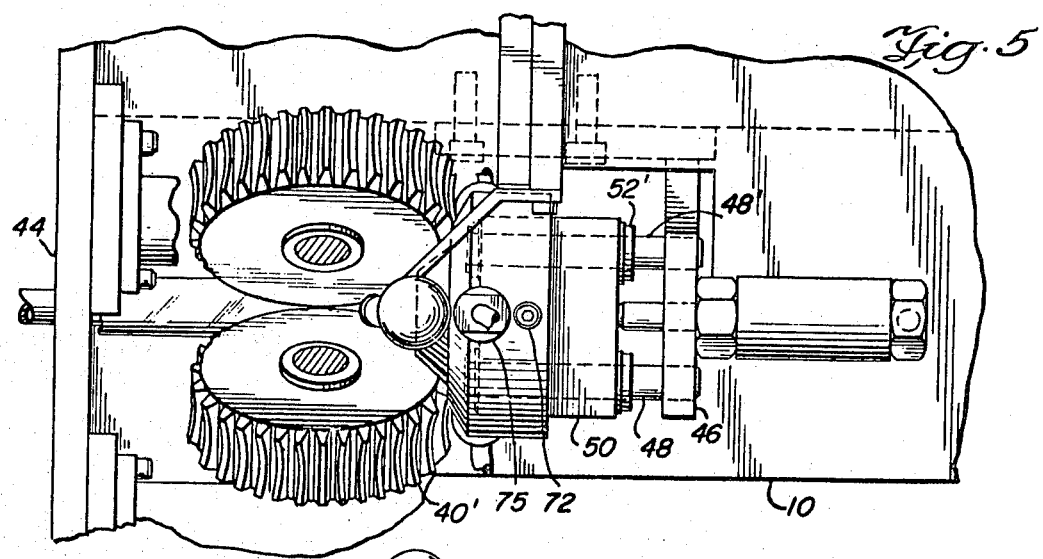
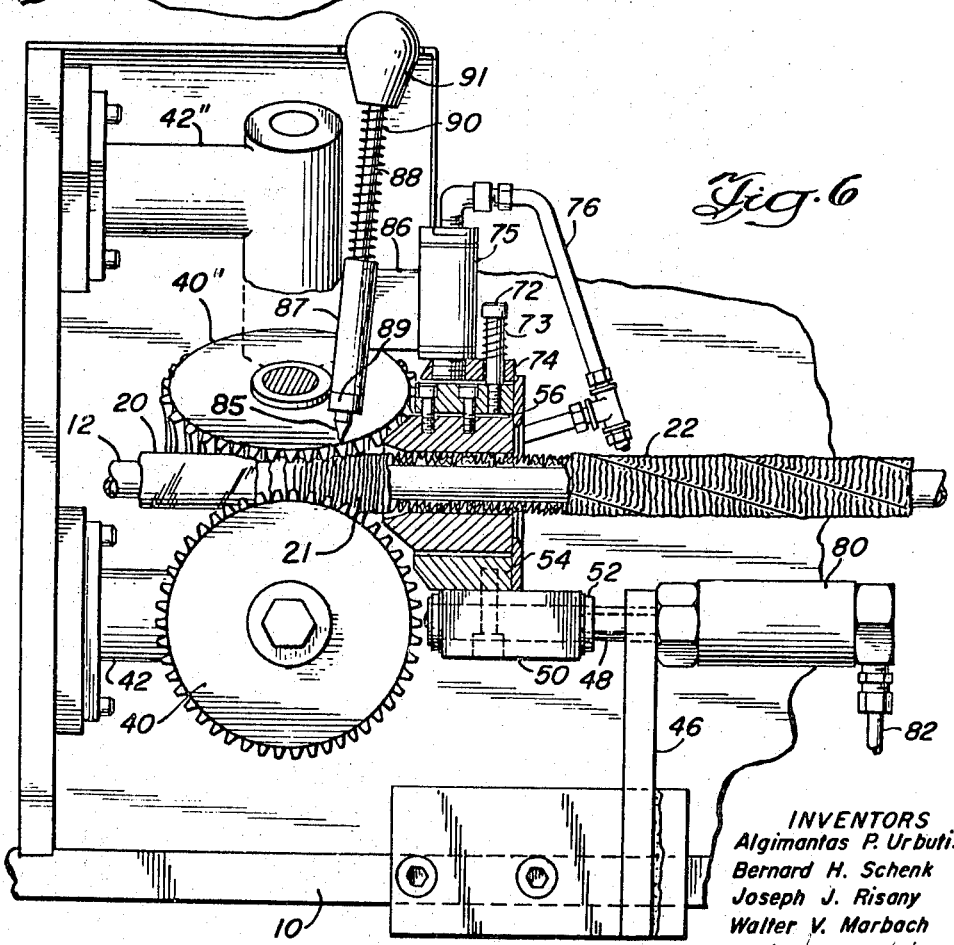

PATENTED OCT 23 1973 3,766,603
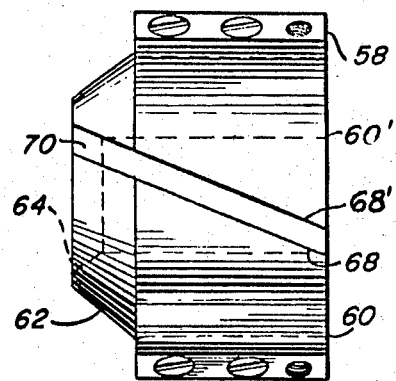
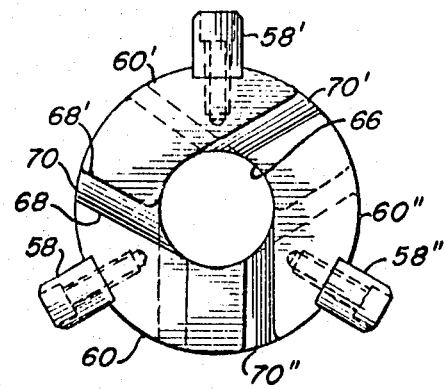
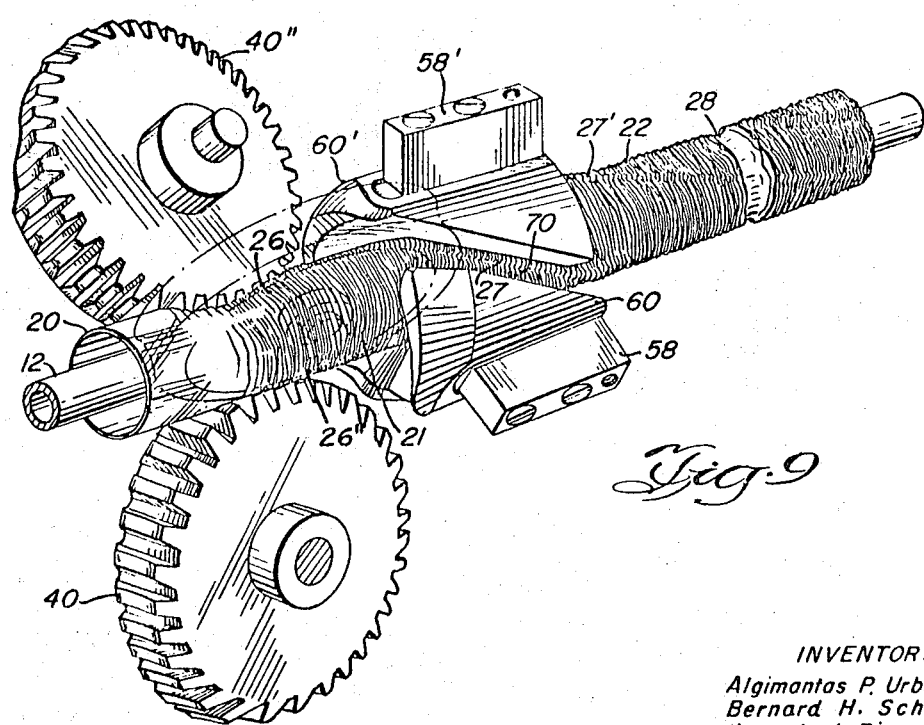
INVENTORS.
Algimantas P. Urbutis
Bernard H. Schenk
Joseph J. Risany
Walter V. Marbach
ATTORNEY INVENTORS.
Algimantas P. Urbutis
Bernard H. Schenk
Joseph J. Risany
Walter V. Marbach By John Holmann
ATTORNEY

SHIRRED TUBING, METHOD AND APPARATUS FOR MAKING SAME

This application is a continuation-in-part of application Ser. No. 765,711, filed May 31, 1968 which was a division of application Ser. No. 418,506 filed Dec. 15, 1964, now U.S. Pat. No. 3,397,069, issued Aug. 13, 1968.

This invention relates to the art of shirring flexible tubular material. More particularly, it relates to the manufacture of flexible tubing shirred and compressed into self-sustaining hollow sticks that are useful as sausage casings and can be extensively used for the production of sausages such as frankfurters, pork sausages and the like.

Flexible tubing used for meat casings may be comprised of proteins, carbohydrates, and the like such as collagens, alginates, starches or cellulosic materials such as cellulose esters, cellulose ethers and regenerated cellulose, as well as other natural, synthetic or artificial materials.

Regenerated cellulose casings are used extensively in the manufacture of skinless frankfurters and this invention will be described with particular reference thereto. In practice, cellulose tubing of an appropriate length such as for example 55 feet, 84 feet, or 110 feet or more is shirred and then compressed to produce what is commonly termed in the art shirred casing sticks of from about 9 inches to 20 inches in length. Such casing sticks may be stuffed with meat emulsion by manual or automatic operations. In a manual operation the stick is sheathed onto a thin walled metal stuffing horn connected to a valved vessel filled with meat emulsion under pressure. The operator controls with one hand the filling and deshirring of the casing and concurrently with the other hand controls the valve and thereby the meat pressure in the stuffing horn to fill the tubing to its proper stuffed diameter.

In an automatic stuffing procedure for making frankfurters, a plurality of shirred casing sticks may be placed in a dispensing hopper of an automatic stuffing-linking apparatus for successively dispensing by rolling on its outer surface one stick at a time to clamping means that align the stick's bore with a reciprocating thin walled meat stuffing horn. The automatic apparatus commonly used in frankfurter production, deshirrs the casing by stuffing it with meat emulsion through the stuffing horn, and then links the filled casing so that it may be processed as is well known in the art, to produce skinless frankfurters.

For reasons of economy and to speed up the stuffing operation the meat packers demand a shirred sausage casing in the form of a self-sustaining shirred stick highly compressed in length, that is uniformly straight, and has a large internal hole or bore. Ene-to-end straightness of the stick and bore is highly desirable to insure the successive dispensing of sticks from a supply loosely piled in a hopper, and transferring the stick to the stuffing means of an automatic stuffing-linking machine. Durability or coherency of the shirred stick as a self-sustaining article is necessary also to insure trouble-free operation with manual and with automatic stuffing apparatus. A large bore in the straight casing stick permits the use of a large diameter stuffing horn and thereby enables more rapid filling of the casing. More efficient frankfurter processing operations are in great demand in the industry to offset increasing labor costs and accordingly, demand highly automated equipment.

Heretofore shirred casing sticks were provided with a large bore but because of the long length of tubing in the shirred sticks (typical commercial lengths are 55 feet, 84 feet and 110 feet) the casing sticks did not always remain straight and on occasion would be disjoined or broken when removed from a shipping carton for use by the meat packer. A break in the stick deshirrs a portion of the casing, causing a discontinuity in the internal bore resulting in jamming on the automatic equipment and extra handling in the manual operation. In the shirring-compressing operation of manufacturing casing sticks, any slight nonuniformity such as in wall thickness that may occur in the process of manufacturing the cellulosic tubing, is accentuated in the reducing of its length from the unshirred to the shirred compressed stick length such as in the ratio of from about 75 to 1. Some additional factors such as moisture in the casing, coloring or striping agents, may cause occasional nonuniformities that make it difficult to maintain the shirred stick in a straight condition after doffing from the shirring mandrel when there is a tendency of the stick to "grow" in length and become bowed. A bowed stick is susceptible to being disjoined or broken and after breaking is unsuitable for use particularly in automatic stuffing equipment. Also, a bowed stick is not readily handled in automatic stuffing equipment.

The principal object of this invention is to provide coherent self-sustaining sticks of shirred flexible tubing having an increased diameter bore for a specific length and wherein the casing has improved coherency against disjoining or breaking and the bore is substantially straight from end to end.

Another object of this invention is to provide shirred and compressed coherent cellulosic sausage casing sticks of improved coherency and straightness that will readily feed from dispensing hoppers and be easily sheathed onto the stuffing horns of automatic stuffing-linking machines.

Another object of this invention is to provide shirred and compressed coherent flexible tubing sticks wherein the pleated tubing wall is uniformly helically distributed in its length with respect to a substantially straight internal bore.

Still another object of this invention is to provide a method for producing shirred flexible tubing which method yields more uniform displacement of the tubing around the mandrel upon which the tubing is shirred.

A further object of this invention is to provide a method of shirring and of interlocking the pleats of the shirred tubing into a uniform spiral superimposed on the normal shirring pleat pattern by coiling and compacting the tubing fed from the shirring means to thereby yield a coherent self-sustaining substantially straight stick.

A further object of this invention is to provide former and holdback means used in combination with a shirring apparatus and a mandrel for superimposing a uniform helical pattern of interlocked tubing pleats onto the pleat pattern of normal shirred tubing and compacting the tubing into a coherent self-sustaining substantially straight stick.

This invention further provides for a former and holdback passage means positioned closely adjacent and centrally aligned with a shirring means and a floating mandrel adapted to uniformly compact and coil the tubing pleats fed from the shirring means about the mandrel into a spirally interlocked pleated tubing wall uniformly distributed in its length with respect to the mandrel.

Another object of this invention is to provide a shirring apparatus in combination with former and holdback means capable of uniformly helically coiling and compacting tubing after it is shirred and which combination is readily adaptable to shirr tubings of different diameters.

Still another object of this invention is to provide a method of marking a predetermined length of shirred tubing on a mandrel, for severing the predetermined length from a continuous strand of tubing, the mark comprising a short length of unshirred casing.

Other and further objects will become apparent hereinafter.

According to one embodiment of this invention there is provided an elongate self-sustaining shirred and compressed stick of tubing of improved coherency suitable for use as a sausage casing. The coherent shirred tubing is substantially circular in cross section and having a substantially straight internal bore from its first end to its second end and a substantially cylindrical exterior surface. In one embodiment the tubing is shirred by pleating on a mandrel by one of several passage forming shirring methods well known in the art; the shirred tubing is then compacted and helically spiraled by gathering and coiling the shirred pleats about the mandrel in a uniform spiral pleat pattern superimposed on the shirred pleat pattern in its passage through an annular spiral former, the pleat pattern of the second end being annularly displaced from the pleat pattern and at a greater pitch than the pleat pattern formed by the shirring passage. In a preferred embodiment, the compacting and spiraling of the shirred pleats in the annular former result in the outer periphery of the pleats being arranged transverse to the bore.

The shirring of regenerated cellulose casing according to one method of practicing this invention is disclosed in Matecki U. S. Pat. No. 2,984,574. The shirring is accomplished by continuously moving the inflated casing by metering rolls from a supply of continuous flattened tubing over a mandrel of smaller diameter than the inflated casing to and through a gyrating shirring passage of smaller diameter than the inflated casing the passage being formed by a plurality of shirring rolls where a predetermined length of the casing is shirred as a first step.

The casing in its shirred form is forced forward along the mandrel from the shirring passage as a result of the forces of the shirring rolls gripping and folding the inflated casing wall, and in its forward advance therefrom is restrained by a closely adjacent compacting means comprising an annular former and holdback passage. The annular former and holdback passage is adapted to resiliently constrictively grip the shirred casing's outer wall uniformly and as the shirring forces feed the casing through the former passage, the helical jaw means compact and helically displace the shirred casing about the mandrel in its advance through the passage as a second step.

When the predetermined length of casing has been shirred and compacted, it is severed from the supply at a mark of unshirred casing as a third step. The mark of unshirred casing indicating the predetermined length is provided at the start of a shirring cycle by allowing a portion of the casing to be shirred without a holdback or restraining force. This can be done by axially moving the holdback passage along the mandrel in the direction of the casing movement during this portion of the shirring cycle. The severed casing length is advanced to a mandrel clamp as a fourth step.

Additional compaction of the helically coiled casing pleats is imparted to the severed length by axially compressing the casing length on the mandrel against the mandrel clamp as a fifth step. In a sixth step the compressed casing length is doffed from the mandrel to yield a self-sustaining substantially straight casing stick.

This invention also provides apparatus having a floating hollow mandrel; means for supporting the mandrel; means for feeding and shirring a predetermined length of casing onto the mandrel; former and holdback passage means for compacting and helically coiling shirred casing about the mandrel; means for marking a predetermined length in a longer length of shirred, compacted and coiled casing and means for severing, compressing and doffing the predetermined length of shirred casing from the mandrel.

In the embodiment shown in the figures the former and holdback passage is a composite annular structure fixedly mounted central to the shirring passage closely adjacent thereto and comprised of a plurality of spaced former jaws, circumferentially equiangularly disposed about the mandrel. The inside surface of each former jaw is curved to a radius approximately the radius of the shirred casing exiting from the shirring passage along the mandrel, and the edge walls of the former jaws in assembly comprise substantially helical grooves, that are spiralled along the length of the jaws forming the holdback passage. The entry ends of the grooves (spaces between the jaws) are each aligned with and are closely adjacent to the mating points of shirring rolls comprising the shirring passage. The former jaws are each radially slidably fastened in the former and holdback structure and are adapted to uniformly resiliently constrict the casing in the holdback passage by common force means cooperatively urging the jaws toward the mandrel.

The shirred casing is forced from the shirring passage along the mandrel as a result of the shirring forces on the inflated casing and is forced into the closely adjacent tapered entry of the cooperating former jaws which restrain the casing's advance, coil and compact the casing pleats about the mandrel and may assist in pressing air from the folds of the casing. In a specific embodiment the mandrel surface in the vicinity of the jaws is provided with flats or grooves to vent the air from the casing folds and thus compact the folds more readily into interlocking pleats.

The helical grooves comprising spaces intermediate the side walls of mating former jaws, serve as threads which engage continuous ridge-like portions or bulges normally present in shirred casing exiting from the mating points of rolls of a multi-roll shirring passage previously described. As the inside surfaces of the jaws restrain the casing's advance to constrict and compact a portion of the casing wall the jaws side walls concurrently coil the casing about the mandrel axis to discharge it from the former passage at a speed less than the peripheral speed of the shirring rolls.

The former and holdback structure is mounted on the machine frame in central alignment with and closely adjacent to the shirring passage to align the former jaws with the continuous bulges in casing advanced from mating shirring rolls; to form and compact casing folds into uniformly interlocking pleats with a minimum of casing inventory intermediate the shirring and former passages; and also stabilizes the free end of the floating shirring mandrel against the vibratory forces of the shirring means.

The piloting effect that the former or constriction jaws exert upon the casing's pleated mass in turn stabilize the floating mandrel's free end and thereby improves uniformity of shirring particularly with the long cantilever supported mandrels used for shirring lengths of casing such as 84 feet and 110 feet.

Compacting the casing's wall by the former jaws also compacts the ridge-like portions normally present in shirred casing, shaping the ridge-like portions into a plurality of spiral crests on the outer surfaces of the shirred casing. Coherency of the casing sticks made by the instant invention has been improved more than about 50 percent over prior art.

The uniform disposition of the casing material about the axis of the mandrel and of the spiralled surface crests obtained by using the shirring method described, maintains the stick substantially straight after removal from the mandrel. Straightness of finished casing sticks made by the instant invention permit the free rolling of a stick under its own weight from rest, down a flat plate sloped at less than 25° to the horizontal, as compared to the relative immobility of prior art shirred casing sticks under the same test.

Heretofore the severing of the predetermined length of shirred casing was done manually by deshirring the casing adjacent the shirring passage and locally stressing the deshirred casing wall between gripping means applied against the mandrel, while concurrently advancing the shirred casing length along the mandrel to a compressing station. The short length inventory of shirred casing remaining fore of the shirring passage was not confined by holdback means during the severing operation and tended to deshirr by expanding in length. When the next shirring cycle started to move the inventory of casing against a retracting holdback surface the previous degree of compaction was not reestablished and the coherency (resistance to breaking) of the prior art compressed sticks was poor, particularly in the area of the inventory.

The annular former and holdback means of the instant invention maintains the shirred casing under uniform compaction throughout substantially the entire cycle of shirring; severing and transferring. By providing a mark of unshirred casing to designate the predetermined length, severing may be done remote from the shirring passage as later described. The holdback passage of this invention is slidably mounted and permitted to move parallel to the mandrel for a short distance such as about ½ inch, to advance with the casing only at the start of shirring. Thus for a very brief time interval the shirring forces feeding the casing along the mandrel are unopposed and a short length such as about 1-½ inch of casing is not effectively shirred, thereby providing indicia designating start of a shirring cycle. The marked portion of the casing is advanced to a convenient point along the mandrel and the preceding shirred length is severed at the mark to be advanced to a compressing station. Casing made with the method of this invention providing continuous compaction and helical coiling into a uniform pattern after shirring and severing of the length remote from the zone of shirring has improved coherency throughout the entire length of the stick. In the drawings:

FIG. 5 is a plan view of a portion of the machine of FIG. 1 showing the former and holdback passage apparatus;

FIG. 6 is a side elevation of a portion of the machine of FIG. 1 showing the former and holdback passage in section and means to reciprocate it to and from the shirring head;

FIG. 7 is an enlarged detail elevation of the former jaws;

FIG. 8 is an end elevation taken along line 8—8 of FIG. 7;

FIG. 9 is an enlarged perspective of the former jaws and holdback passage juxtaposed about the shirred casing on a portion of the mandrel;

Figure 1:
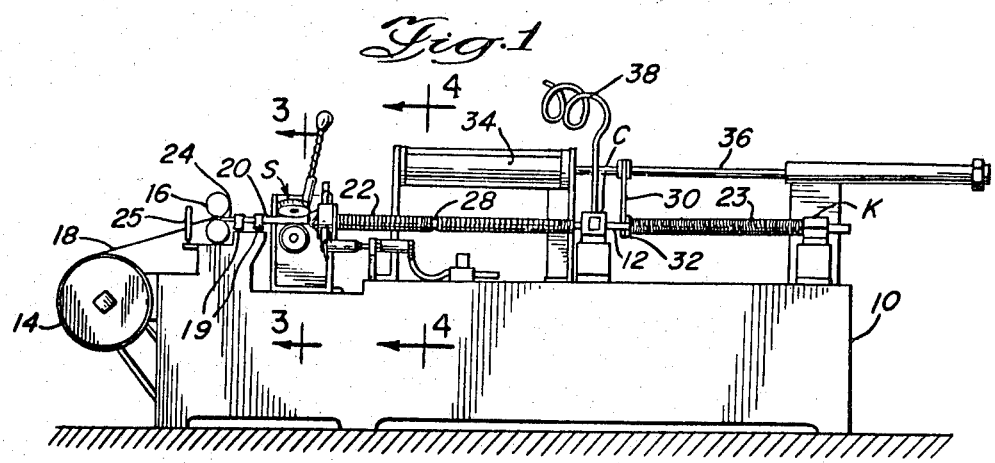
FIG. 1 is a diagrammatic side elevation of a shirring apparatus, showing the preferred embodiment of the present invention.

As may be seen from FIG. 1 in the operation of the shirring machine a supply of flattened tubing such as cellulosic tubing 18 is intermittently withdrawn from a supply reel 14. The flattened tubing 18 is expanded as by gaseous means and advanced through a pair of vertical guide rolls 25 to metering rolls 16 and the metered inflated tubing 20 is aligned centrally by two pairs of annularly grooved rolls 19 arranged in tandem, which guide the tubing onto hollow mandrel 12 and through shirring head S.

Figure 2:
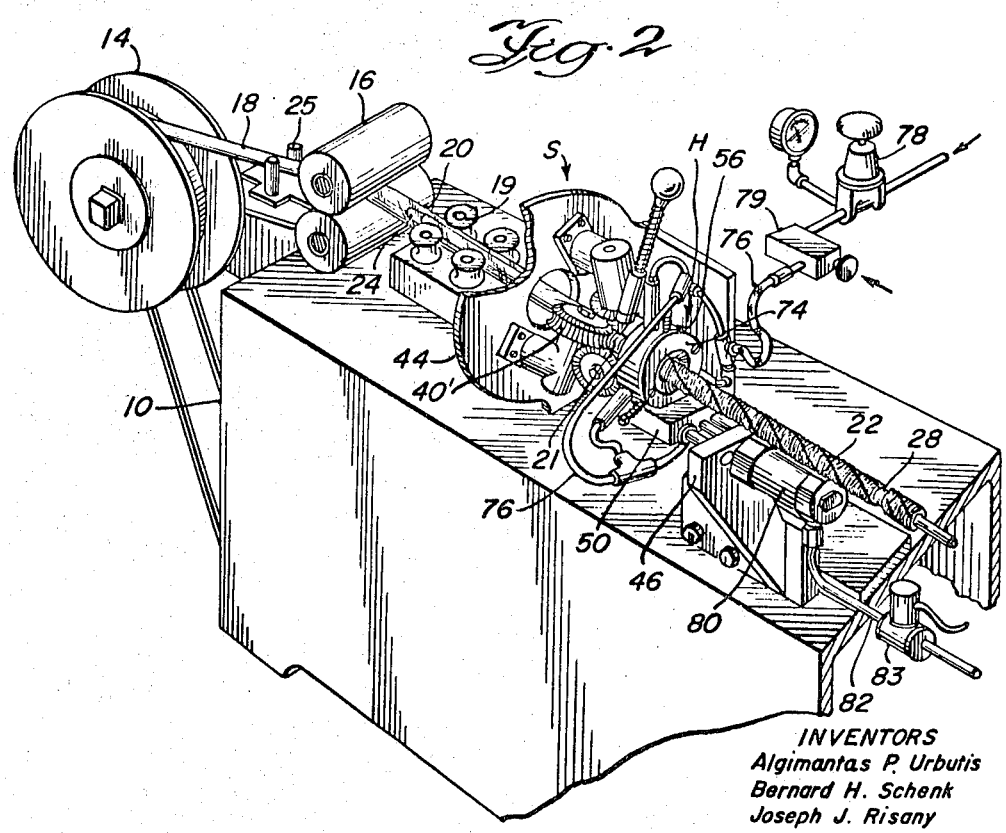
FIG. 2 is a perspective of the upper left hand portion of a shirring apparatus shown in FIG. 1 and showing a mandrel in a central passage of the shirring means, and the former and holdback means.
Figure 3:
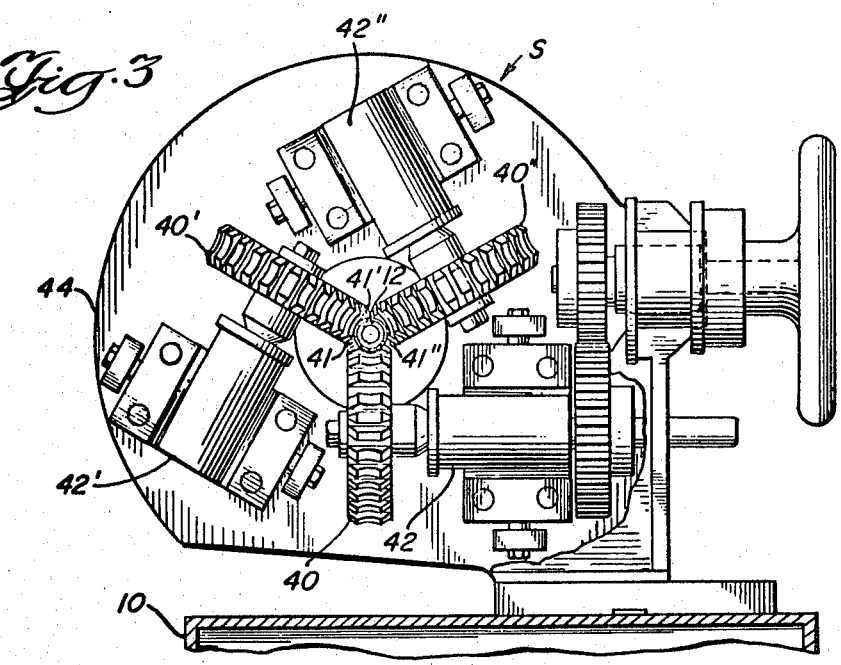
FIG. 3 is a horizontal section taken along the line 3—3 of FIG. 1 showing a typical shirring head that may be used with the apparatus of the invention.

The desired length of inflated casing 20 is loosely shirred by any of a number of suitable shirring heads S mounted on machine frame 10, among which for example are those as shown in FIGS. 2 and 3 and described in Matecki U. S. Pat Nos. 3,097,393, 2,983,949 and 2,984,574. In a specific embodiment shirring head S typically such as is disclosed in Matecki U. S. Pat. No. 2,984,574 and as may be seen from FIG. 3 is comprised of a face plate 44 mounting angle gear box units 42, 42', 42'' and interconnected to drive cogged shirring rolls 40, 40', 40'' at the same speed and direction. The annularly grooved cogged rolls 40, 40', 40'' are aligned to provide a shirring passage centered on mandrel 12. In the arrangement shown, roll 40 centerline is aligned with a 6 o'clock axis, roll 40' with a 10 o'clock axis and roll 40'' with a 2 o'clock axis. Mating points 41, 41', 41'' of the rolls' beveled surfaces occur at 12 o'clock, 4 o'clock and 8 o'clock axes. In shirring inflated casing with the three-roll shirring head slight bulges 26, 26', 26'' normally occur in the cylindrical outer surface of the shirred casing that are aligned with the mating points of the rolls. These bulges are herein referred to as ridge-like portions of the shirred casing outer wall.

Figure 10:
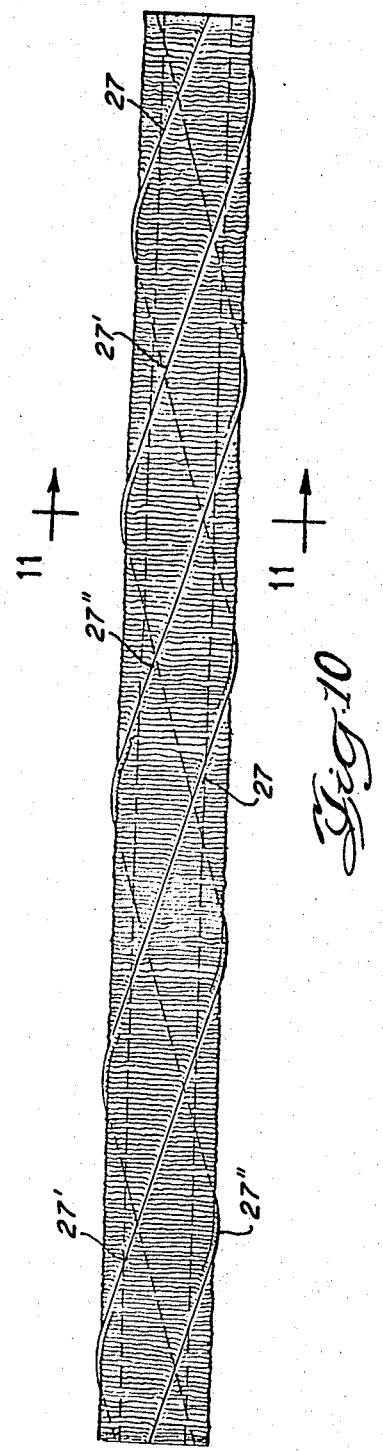
FIG. 10 is a side elevation of a casing stick of the invention.
Figure 11:
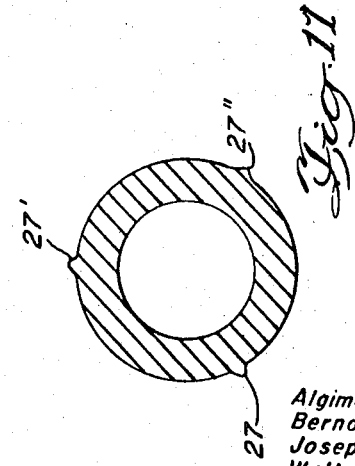
FIG. 11 is an enlarged transverse section of the casing stick taken along the line 11—11 of FIG. 10.

The loosely shirred casing 21 is restrained in its advance from the shirring head S by a former and holdback passage shown generally as H in FIGS. 1 and 2. The former and holdback means which is later described in detail, compacts the loosely shirred casing length by coiling and interlocking the pleats and folds of the shirring in a uniform spiral end to end about the mandrel surface 12 and compacts the bulges into a plurality of spiral crests 27, 27', 27'' that may be seen in FIGS. 10 and 11. It is believed that the crests 27, 27', 27'' additionally serve to stiffen the compacted casing stick and improve its coherency.

The leading end of the floating hollow mandrel 12 has a tip 24 positioned between the shirred head S and the nip of the metering rolls 16. Gaseous inflating means is supplied to the casing 20 through tip 24 of mandrel 12 which is supported in stationary position by clamps C, K. The inflating air is supplied to the mandrel 12 through first clamp C connected to a compressed air supply hose 38.

The compacted shirred casing length 22' is severed from the previously compacted shirred casing length 22 at a mark of unshirred casing 28 made at the start of a shirring cycle by means later described, clamp C is opened and the severed casing length 22' is advanced along mandrel 12 until its fore end abuts closed clamp K. Compressor arm 30 is rotatably fixed on piston rod 36. A pair of mandrel encircling jaws 32 are mounted on the outboard end of compressor arm 30 to engage mandrel 12 aft of the severed casing. Pneumatic cylinder 34 is actuated thereby advancing piston rod 36 and compressing the severed casing length 23 against clamp K. The cylinder 34 is released, thereby retracting compressor arm 30 and concurrently lifting it from mandrel 12. Clamp C is closed, clamp K is opened and the compressed casing length 23 is doffed from the end of mandrel 12.

Meantime the next shirring cycle provides a next successive lengths of compacted casing 22 and the operation of severing, transferring, compressing and doffing of the stick of casing is repeated.

Figure 4:
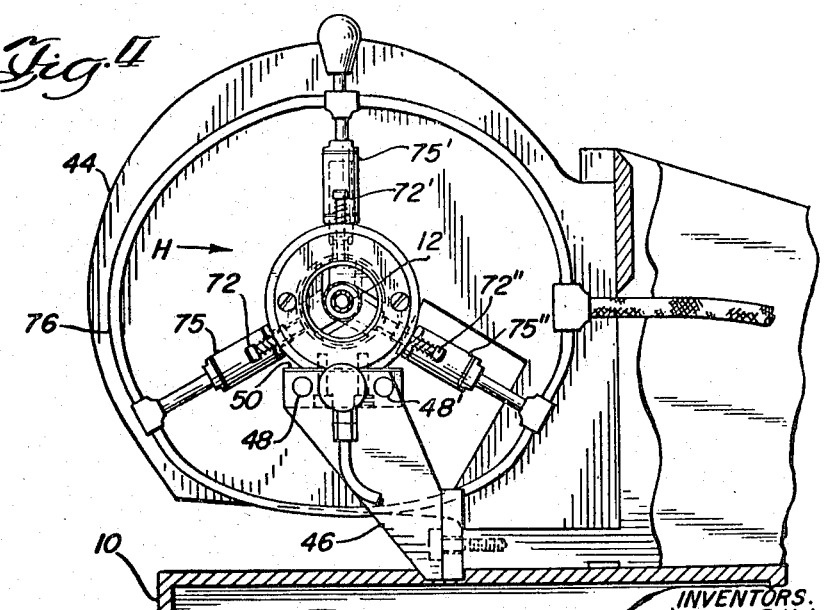
FIG. 4 is a horizontal section taken along the line 4—4 of FIG. 1 showing the former and holdback passage apparatus.

Refer now to FIGS. 4, 5, and 6. The former and holdback structure H is mounted to machine frame 10 by angle bracket 46. Adjacent the upper end of bracket 46 is horizontally mounted a pair of slide rods 48, 48' cantilevered from bracket 46 toward the shirring passage, and spaced equidistant about the vertical center line of mandrel 12. The slide rods 48, 48' in combination comprise slide ways for elongate parallel ball bushings 52, 52' pressed into carriage block 50, on the top surface of which is horizontally fastened the holdback mounting sleeve 54 centered on mandrel 12. Mounting sleeve 54 has equiangularly spaced grooves 56, 56', 56'' longitudinally aligned with mandrel 12, the grooves being arranged about the inner surface of sleeve 54 at the 12 o'clock, 4 o'clock and 8 o'clock axes, and which are also aligned with mating points 41, 41', 41'' of the shirring rolls 40, 40', 40''.

Refer now to FIGS. 7, 8, and 9. Three identical former jaws 60, 60', 60'' have tongues 58, 58', 58'' each tongue being machined for a slide fit in grooves 56, 56', 56'' The former jaws as seen in FIG. 7 are represented as being in normal assembly in mounting sleeve 54. Former jaws 60, 60', 60'' have a casing entry end having a conical pilot surface 64. The internal casing compacting surface 66 is cylindrical and is machined to a diameter approximating the external diameter of shirred casing 21 such as about 1 inch diameter for a code 26 casing. The former jaw's inner surface 66 may be made of metal such as steel or of any material capable of maintaining a smooth, polished, shaped surface without abrading the casing passing therethrough. The axial edges 68, 68', 68'' of the former jaws are machined to be spaced apart about 3/16 to ¼ inch at an angle of about from 20° to 25° to the mandrel 12 axis, to provide substantially helical grooves 70, 70', 70''. Grooves 70, 70', 70'' are arranged to engage the bulges or ridge-like portions of the casing wall occuring at the exit of the shirring passage and thereby axially displace the bulges and coil the casing about the mandrel as it is forced through the forming passage. The constricting pressure of the jaws form the shirred casing into a helically interlocked pleated structure and concurrently the jaw edges comprising grooves 70, 70', 70'' also compress the bulges into more compact crests 27, 27', 27'' which may be seen in FIGS. 10 and 11.

Refer again to FIG. 6 where it may be seen that the jaws' tongues 58, 58', 58'' are slideably fastened into the grooves 56, 56', 56'' of sleeve 54 by end thrust plate 74 Cap screws 72, 72', 72'' fastened to tongues 58, 58', 58'' resiliently urge the tongues outwardly from mandrel 12 by compression spring means 73, 73', 73''. Single acting air cylinders 75, 75', 75'' are radially fastened in sleeve 54 centered on grooves 56, 56', 56''. Piston rods of the air cylinders are arranged to abut the inner surface of grooves 56, 56', 56''. The air cylinders are commonly actuated by means later described. When pressurized, such as to about 35 to 50 pounds per square inch air pressure to provide about 15 to 22 pounds of force, the pistons of the air cylinders 75, 75', 75'' engage the top surfaces of tongues 58, 58', 58'' to urge the jaws inwardly toward mandrel 12 thereby constricting internal compaction surfaces 56, 56' 56'' about the casing 21 advanced along mandrel 12 by the rotative force of shirring rolls 40, 40', 40''.

The constriction forces applied to the outer surface of casing 21 by the three jaws determines the degree of compaction and restraint the shirred casing exerts against the shirring forces and the resulting forming of the shirred casing into a helically spiralled shirred stick. The casing bulges advanced into the spaces comprising grooves 70, 70', 70'' are not immediately compacted but contact the jaw edges 68, 68', 68'' and act similar to the threading of a long lead multiple thread bolt into a mating nut, to coil the pleats concurrently as they are nested together in the former passage. As the compacted shirred casing passes through the former jaws, the bulges are formed into spiralled crests 27, 27', 27'' resulting in a stiff interlocked pleated casing.

Refer again to FIGS. 1 and 2. The cir cylinders 75, 75', 75'' are commonly connected by pipe 76 to air pressure regulating means 78. Adjustment of regulator means 78 provides a uniform adjustable compacting force on the casing which controls the degree of compaction that may be obtained between the former jaws and the shirring passage. A uniform force of from about 15 to 25 pounds on each of the jaws has been found desirable to achieve the desired compaction of the shirred casing. A bypass air valve 79 iss provided to release pressure on the jaws when it is necessary, and retract them from mandrel 12 to restring casing onto the mandrel 12.

Air cylinder 80 is horizontally mounted on bracket 46 in vertical alignment with mandrel 12. Air cylinder 80 is connected by supply pipe 82 through solenid operated air valve 83 to a source of compressed air. When valve 83 is opened through an appropriate electrical signal, cylinder 80 is pressurized and piston rod 81 is extended about ½ inch from bracket 46 to abut the end surface of carriage 50 and advance it on slide ways 48, 48' to the normal operative position closely adjacent the shirring passage.

Cylinder 80 is pressurized for the greater part of the shirring cycle to maintain the former passage adjacent the shirring passage. When shirring stops and clamp C is opened, the air pressure on cylinder 80 is released. For a brief time interval at the start of shirring, cylinder 80 is not pressurized, thereby permitting the holdback jaw assembly on carriage 50 to be moved on the slide ways 48 by the shirring forces exerted on loosely shirred casing 21, until carriage 50 is arrested by abutment with bracket 46.

Thus for the brief time interval noted, the shirred casing 21 is fed from the shirring passage against substantially less than normal holdback restraining force, and a length of about 1½ inches of casing is not normally nor regularly shirred against the former and holdback means. Air pressure is reestablished after several seconds of shirring and carriage 50 is returned to normal operating position adjacent the shirring passage thereby maintaining substantially uniform compaction in casing 22. The abnormally or irregularly shirred length of casing resulting from the momentary concurrent advancing carriage and casing movement provides distinctive visual indicia 28 of the desired predetermined length of shirred, compacted casing 22 and permits the severing step to be done at a point remote from the shirring passage.

In the operation of the shirring machine the supply of continuous casing tubing 18 may have occasionally occuring faults such as tubing breaks, tubing couplers or splices that require halting the shirring, removal of the faulty tubing and a restringing of a fresh supply of tubing. In order to maintain the normal compaction of the previously shirred compacted length 22, it is desirable to remove the faulty tubing and as little as possible of the shirred casing 21. A pointed brass pick 85 is provided in a unit mounted adjacent the shirring passage to easily restrain the shirred casing 21 advanced therefrom and sever the shirred casing's trailing end against mandrel 12 while the faulty tubing is removed from the machine.

Bracket 86 fastened to machine frame 10, is provided with slide sleeve 87 diagonally aligned with mandrel 12. Conical pick 85 is preferably brass and is fastened to a shoulder 89 on one end of rod 88, that is slidably mounted in slide sleeve 87. Rod 88 is urged upwardly by compression spring 89 to abut shoulder 89 with the lower end surface of slide sleeve 87 and thereby normally maintain pick point 85 out of engagement with shirred casing 21. Knob 91 on the upper end of rod 88 is used to manually depress the pick point into engagement with mandrel 12 while faulty tubing is severed and removed from the machine.

The former or holdback means of the invention is preferably arranged and adjusted in combination with a shirring means and a mandrel; to superimpose on a normal shirred casing a uniformly spiralled interlocked pattern of pleats concurrently compacted to a length of from about 1/30 to 1/50 of its unshirred length and axially coiled about the mandrel at least from 2 to 8 or more degrees of revolution per 1 foot of unshirred length.

The invention may be employed in connection with shirring; compacting and coiling; and compressing cellulose sausage casings of varying diameters and wall thicknesses. It is particularly useful in connection with casings ranging in diameter from 9/16 inch to 1-¼ inches and having wall thickness of from about 0.0006 or less to 0.003 inch or more.

Several actual forms of apparatus according to the invention were constructed and operated by means of the three-jaw apparatus illustrated in FIGS. 1 to 11 to shirr casing of 0.84 inch inflated diameter at the rate of about 700 feet per minute of casing length, said casing being shirred with a three-roll arrangement of cogged rolls shaped according to the teachings of Matecki U.S. Pat. No. 2,983,949 and a three-jaw holdback of the following specifications:

| | |
|---|---|
| Inflated casing diameter | 0.840 inch |
| Jaw length | about 1¾ inch |
| Diameter of jaw inner surface | 31/32 inch |
| Space between jaws in normal assembly | about 7/32 inch |
| Mandrel diameter | |
|   in shirring passage | 0.620 inch |
|   in former passage | 0.580 inch |
| Angle of coiling groove to the mandrel axis | about 22° |
| Pounds force applied to each jaw | about 17 to 20 lbs. |

In repeated operations 84 foot lengths of 0.84 inch inflated diameter casing supply were shirred on a 0.620 inch diameter mandrel and compacted to a length of about 24 inches concurrently while the shirring pleats at the fore end of the compacted casing lengths were uniformly coiled more than 550° of revolution about the mandrel with respect to shirring pleats at the aft end of the casing lengths; and the casing was compressed to a length of about 14 inches. A typical 84 foot casing stick may be seen in FIG. 10.

These 84 foot casing sticks of 0.84 inch inflated diameter casing were tested and found to be of a cylindrical straightness such that they would roll from rest under their own weight, down a flat metal plate sloped at an angle of 25° to the horizontal. Routine testing of casing sticks made by the instant invention demonstrated that consistent coherency of the sticks (resistance to disjoining or breaking) when tested by the following coherency test method was within a range of 3.0 to 4.0 inch-lbs. force.

Prior art shirred casing sticks, that were shirred and compressed by the same method as herein described, but not compacted by passing and forming through a former and holdback means herein described, had a coherency of from 1.8 to 2.5 inch-lbs force.

COHERENCY TEST METHOD

Coherence of a casing stick is determined by measuring the force required to break a 2-¼ inch unsupported extension of the shirred stick on a polished steel rod of 7/16 inch diameter which is cantilevered to a wooden test stand. The test stick is cut at a point 2 inches from its fore end and the short length discarded. The longer section is then deshirred 2-½ inches at the cut end, and a 3 inch length of ¾ inch wide pressure-sensitive tape (Permacel No. 10004) is applied over the 2-½ inch deshirred tab and the last ½ inch of shirred stick. Then the taped stick is positioned on the steel rod against a reference marker which allows a 2-¼ inch extension of the casing stick to project beyond the rod end. A force gauge (such as Hunter Force Indicator, Model L-1M with a "Hold at Maximum Device") is fastened to the tape-supported tab by means of a spring loaded jaw, and the tab is slowly pulled down until the stick breaks. The force reading is noted, and the actual length of the broken section is measured to the nearest 0.1 inch. The product of the force in pounds multipled by the length in inches is reported as coherence in inch-pounds of force.

It will be obvious to those skilled in the art that the relative motion of the casing about the mandrel can be obtained by other means such as rotating the former jaws about the mandrel by suitable means similar to that illustrated, for example, in Isenberg, U. S. Pat. No. 2,610,607 issued Sept. 16, 1952, Stocker, U.S. Pat. No. 2,779,970 issued Feb. 5, 1957 or other means well known in the art, taking into consideration the desired rate of rotation of the jaws about the mandrel, the angular spacing of the jaws from each other, and the pressure exerted by the jaws against the shirred casing.

In FIG. 9, for example, the former jaws 60, 60' and 60'' can be readily rotated about shirred casing 21 supported on mandrel 12, by rotating drive means not shown. The rotating former jaws 60, 60', 60'' engage the casing wall and thereby axially displace and coil the casing about the mandrel. The degree of twist of the helically interlocked pleated structure will be somewhat greater than afforded by stationary jaws and coherency of the sticks is even further enhanced.

Another method of imposing a helical pattern about a shirred pleat pattern is to impart rotating motion to the mandrel with respect to the shirring passage; and preferably rotating and concurrently retracting the mandrel in the shirring passage.

Since it is obvious that various changes and modifications may be made in the above description without departing from the nature or spirit thereof, this invention is not restricted thereto except as set forth in the appended claims.

What is claimed is:

1. In a machine for producing coherent self-sustaining sticks of shirred flexible tubing, a mandrel; means for shirring such tubing on said mandrel; and means adjacent said shirring means for compacting the shirred tubing comprising a plurality of former jaws circumferentially mounted about said mandrel.

2. In a machine for producing coherent self-sustaining sticks of shirred flexible tubing, means for compacting and helically coiling shirred tubing which means are comprised of a plurality of former jaws equiangularly positioned and moveably mounted about a shirring mandrel, means for resiliently urging said jaws uniformly toward said mandrel.

3. The means in claim 2 wherein the jaw edge walls are in annular assembly and spaced apart at an angle to the mandrel axis.

4. The means in claim 2 wherein the jaw edge walls are in annular assembly and spaced apart at an angle of 20° to 25° to the mandrel axis.

5. In a shirring machine for shirring flexible tubing by compacting and coiling shirred tubing about a mandrel into a hollow self-sustaining straight stick which comprises shirring means; an annular former and holdback means positioned about the mandrel adjacent said shirring passage, the former and holdback means having a plurality of spaced apart jaws forming a cylindrical central passage and mating with the shirred tubing's outer wall, means to uniformly constrict the jaws about the tubing to form and coil the casing about the mandrel when the casing is advanced through the former and holdback means.

6. In a machine for shirring flexible tubing into a coherent self-sustaining compressed shirred stick having a straight bore of predetermined size and a substantially cylindrical outer surface the combination which comprises a hollow mandrel; means for supporting the mandrel; means for feeding and shirring a predetermined length of tubing onto the mandrel; a former and holdback passage means for compacting and helically coiling shirred casing about the mandrel, means for controllably positioning the former and holdback passage means; means for severing a predetermined length of shirred tubing; means for compressing and means for doffing the shirred tubing from the mandrel.

7. In a machine for shirring flexible tubing into a coherent self-sustaining compressed shirred stick having a straight bore of predetermined size and a substantially cylindrical outer surface the combination which comprises a hollow mandrel; means for supporting the mandrel; means for feeding and shirring a predetermined length of tubing onto the mandrel; a former and holdback passage means for compacting and helically coiling shirred casing about the mandrel, means for controllably positioning the former and holdback passage means.

8. A machine for shirring flexible casing including a mandrel over which inflated casing is passed; means for shirring said casing on said mandrel; and means to engage the shirred casing and rotate the same on said mandrel.

9. The machine of claim 8 wherein said means to engage is adjacent to said shirring means and engages said shirred casings outer wall.

10. The machine of claim 8 wherein said engaging means is a rotatable mandrel.

11. The machine of claim 10 wherein said rotatable mandrel is retractable.

12. A machine for shirring flexible casing including a mandrel over which inflated casing is passed and means to indent and compress the inflated casing into an ordered pattern of shirred pleats and rotatable means to engage the shirred casing and rotate the same about said mandrel.

13. A machine as defined in claim 12 in which said rotatable means includes holdback means engageable with the shirred casing opposite the casing indenting means to resist movement of the shirred casing along the mandrel and cause the same to be compacted.

* * * * *